UNITED STATES PATENT OFFICE 2,127,471

AZO DYESTUFFS INSOLUBLE IN WATER AND FIBER DYED THEREWITH

Fritz Müller, Willy Schumacher, and Otto Scherer, Frankfort-on-the-Main, Germany, assignors to General Aniline Works, Inc., New York, N. Y., a corporation of Delaware No Drawing. Application October 28, 1937, Serial No. 171,476. In Germany October 30, 1936

12 Claims. (Cl. 260—203)

The present invention relates to azo-dyestuffs insoluble in water and to fiber dyed therewith; more particularly, it relates to dyestuffs of the following general formula:

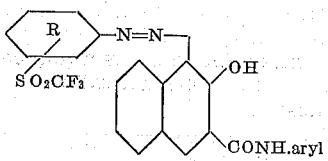

wherein the nucleus R may contain further substituents.

We have found that dyestuffs of technically valuable tints and good properties of fastness are obtainable by coupling a diazonium compound from an amino-substitution product of trifluoromethylphenylsulphone corresponding with the following formula:

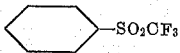

or from a substitution product thereof which does not contain any group lending solubility, with a 2,3-hydroxynaphthoic acid arylide.

The dyestuffs may be produced in substance, on the fiber or on a substratum adapted for the production of lakes.

When produced on the fiber, the dyestuffs are subject to the known high demands in respect of resistance to alkaline agents and it is surprising that the trifluoromethylsulphone group present in the dyestuff molecule and consisting of two strongly negative radicals is not only stable to the alkaline treatment but also improves the properties of the dyeings.

The new dyestuffs are particularly distinguished by their very good fastness to light. In this respect they surpass the known water-insoluble azo-dyestuffs obtainable by coupling diazotized aminobenzenealkylsulphones or diazotized aminotrifluoromethylbenzenes with 2.3-hydroxynaphthoic acid arylides.

The aminophenyltrifluoromethylsulphones used in this process as diazo-components may be prepared by reduction of the trifluoromethylphenylsulphones substituted by a nitro-group and obtainable as described in U. S. Patent No. 2,108,606, issued February 15, 1938, or by reduction of the nitro-compounds made by nitration of trifluoromethylphenylsulphones. The ortho- and para-amino-derivatives are suitably prepared by causing nitric acid to act in the presence of sulphuric acid on trifluoromethylphenylsulphides obtainable as described in U. S. Patent No. 2,108,606, oxidizing the nitrophenyltrifluoromethylsulphoxides formed and reducing the nitrated sulphones thus obtained.

The following examples serve to illustrate the invention, but they are not intended to limit it thereto:

(1) Grounding liquor 4 grams of 1-(2'.3'-hydroxynaphthoylamino)-2.4-dimethoxy-5-chlorobenzene are dissolved in a mixture of

- 6 cc. of alcohol,
- 2 cc. of pyridine,
- 2 cc. of caustic soda solution of 34° Bé. and
- 6 cc. of water with addition of
- 2 cc. of a formaldehyde solution of 30 per cent. strength. This solution is introduced into a bath containing
- 10 cc. of Turkey red oil of 50 per cent. strength and
- 10 cc. of caustic soda solution of 34° Bé. in
- 1000 cc. of water at 30° C.

Developing solution 2.46 grams of 4-methoxy-3-aminophenyl-1-trifluoromethylsulphone are made into a paste with

- 10 cc. of acetone;
- 1.42 grams of zinc chloride,
- 3.1 cc. of hydrochloric acid of 20° Bé. and
- 5 grams of ice are then added and, while cooling,
- 8 cc. of a sodium nitrite solution 1:10 are caused to run in.

After complete diazotization, the whole is filtered,

- 8 grams of dissolved sodium acetate are added and after addition of
- 20 grams of sodium chloride the whole is made up to
- 1000 cc. by means of water.

Dyeing process 50 grams of cotton are treated for half an hour at 30° C. in the grounding liquor. The whole is then well centrifuged and dyed for half an hour in the developing solution; the material is subsequently rinsed, soaped at boiling temperature, rinsed again and dried. A yellowish red dyeing of very good fastness to light is obtained. The dyestuff corresponds with the following formula:

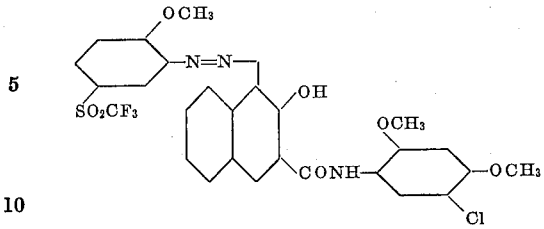

(2) While well stirring, a solution of 29.5 parts by weight of 1-(2',3'-hydroxynaphthoylamino)-2-methoxybenzene rendered alkaline by means of caustic soda and to which there has been added the amount of sodium acetate solution necessary for binding the excess of mineral acid, is caused to run slowly into a diazo-solution prepared in the usual manner from 22.5 parts by weight of 3-aminophenyl-1-trifluoromethylsulphone. After formation of the dyestuff is finished, the whole is filtered with suction and washed well. The dyestuff is advantageously worked up into the form of a paste. When mixed with one of the usual substrata, it yields an orange-red lake having very good properties of fastness. The dyestuff may also be prepared by mixing the diazo solution with a substratum, for instance, barytes, zinc white or the like, and running in the arylide solution.

(3) A cotton fabric is padded with a solution containing 13.2 grams of 1-(2',3'-hydroxynaphthoylamino)-benzene
20 grams of Turkey red oil, and
20 cc. of caustic soda solution of 32.5 per cent. strength and made up to 1 litre and is then dried. Thereupon, the fabric is printed with a printing paste prepared as follows: The solid diazonium compound from 12.7 grams of 4-methoxy-3-aminophenyl-1-trifluoromethylsulphone is dissolved in
10 cc. of acetic acid of 50 per cent. strength and
400 cc. of water; the whole is thickened by means of
400 grams of starch tragacanth thickening and made up to
1 litre.

After printing, the fabric is dried, then treated with a hot sodium carbonate solution (10 grams per litre), rinsed while cold, soaped at boiling temperature, rinsed again, dried and worked up. A print having a vivid red tint is obtained.

The following table includes a number of other azo-dyestuffs obtainable according to the present invention:

| | Diazo-compound from— | Coupled with— | Tint |
|---|---|---|---|
| | *1-(2',3'-hydroxynaphthoylamino)-* | | |
| (1) | 4-methoxy-3-aminophenyl-1-trifluoromethylsulphone | 2-methyl-4-methoxybenezene | Yellowish red. |
| (2) | 4-methoxy-3-aminophenyl-1-trifluoromethylsulphone | 3-methyl-4-methoxybenzene | Do. |
| (3) | 4-methoxy-3-aminophenyl-1-trifluoromethylsulphone | 2-methoxybenzene | Scarlet. |
| (4) | 4-methoxy-3-aminophenyl-1-trifluoromethylsulphone | 4-methoxybenzene | Yellowish red. |
| (5) | 4-methoxy-3-aminophenyl-1-trifluoromethylsulphone | Benzene | Vivid middle-red. |
| (6) | 4-methoxy-3-aminophenyl-1-trifluoromethylsulphone | 2-methylbenzene | Do. |
| (7) | 4-methoxy-3-aminophenyl-1-trifluoromethylsulphone | 2-methoxy-5-chlorobenzene | Scarlet. |
| (8) | 4-methoxy-3-aminophenyl-1-trifluoromethylsulphone | 2,5-dimethoxy-4-chlorobenzene | Yellowish red. |
| (9) | 4-methoxy-3-aminophenyl-1-trifluoromethylsulphone | 2-ethoxybenzene | Scarlet. |
| (10) | 4-methoxy-3-aminophenyl-1-trifluoromethylsulphone | Naphthalene | Vivid bluish red. |
| (11) | 4-methoxy-3-aminophenyl-1-trifluoromethylsulphone | 4-chlorobenzene | Do. |
| (12) | 4-ethoxy-3-aminophenyl-1-trifluoromethylsulphone | Benzene | Middle-red. |
| (13) | 3-aminophenyl-1-trifluoromethylsulphone | 2,4-dimethoxy-5-chlorobenzene | Brown-red. |
| (14) | 3-aminophenyl-1-trifluoromethylsulphone | 2-methoxybenzene | Red-orange. |
| (15) | 4-methyl-3-aminophenyl-1-trifluoromethylsulphone | 2-methoxybenzene | Vivid red-orange. |
| (16) | 4-methyl-3-aminophenyl-1-trifluoromethylsulphone | 3-methyl-4-methoxybenzene | Brick-red. |
| (17) | 4-chloro-3-aminophenyl-1-trifluoromethylsulphone | 2-methoxybenzene | Orange. |
| (18) | 4-chloro-3-aminophenyl-1-trifluoromethylsulphone | 2-methylbenzene | Red-orange. |
| (19) | 4-chloro-3-aminophenyl-1-trifluoromethylsulphone | 4-chlorobenzene | Do. |
| (20) | 4-bromo-3-aminophenyl-1-trifluoromethylsulphone | 2-methoxybenzene | Orange. |
| (21) | 5-chloro-2-aminophenyl-1-trifluoromethylsulphone | 3-methyl-4-methoxybenzene | Yellow-red. |
| (22) | 5-chloro-2-aminophenyl-1-trifluoromethylsulphone | 4-chlorobenzene | Yellowish scarlet. |
| (23) | 4-aminophenyl-1-trifluoromethylsulphone | 2-methoxybenzene | Scarlet. |
| (24) | 4-aminophenyl-1-trifluoromethylsulphone | 4-methoxybenzene | Brownish red. |
| (25) | 3-aminophenyl-4-methylsulphone-1-trifluoromethylsulphone | Benzene | Golden-yellow. |
| (26) | 3-aminophenyl-4-ethylsulphone-1-trifluoromethylsulphone | Benzene | Do. |
| | *2-(2',3'-hydroxynaphthoylamino)-* | | |
| (27) | 4-methoxy-3-aminophenyl-1-trifluoromethylsulphone | Naphthalene | Yellowish scarlet. |
| (28) | 4-methyl-2-aminophenyl-1-trifluoromethylsulphone | Naphthalene | Vivid scarlet. |
| | *1-(2',3'-hydroxynaphthoylamino)-* | | |
| (29) | 4-methyl-2-aminophenyl-1-trifluoromethylsulphone | 2-methyl-4-chlorobenzene | Yellowish scarlet. |
| (30) | 2-chloro-5-aminophenyl-1-trifluoromethylsulphone | Benzene | Scarlet. |
| (31) | 2,4-dichloro-6-aminophenyl-1-trifluoromethylsulphone | 2-methoxybenzene | Covered red. |
| (32) | 2,4-dichloro-5-aminophenyl-1-trifluoromethylsulphone | 2-methyl-4-chlorobenzene | Bluish red. |
| (33) | 3,4-dichloro-5-aminophenyl-1-trifluoromethylsulphone | 4-chlorobenzene | Vivid red-orange. |
| | *2-2',3'-hydroxynaphthoylamino)-* | | |
| (34) | 3,4-dichloro-6-aminophenyl-1-trifluoromethylsulphone | Naphthalene | Scarlet. |
| | *1-(2',3'-hydroxynaphthoylamino)-* | | |
| (35) | 2,4-dibromo-6-aminophenyl-1-trifluoromethylsulphone | 2-methoxybenzene | Red. |
| (36) | 2,4-dimethoxy-5-aminophenyl-1-trifluoromethylsulphone | 2-methyl-4-chlorobenzene | Ruby-red. |
| (37) | 2,4-dimethoxy-5-aminophenyl-1-trifluoromethylsulphone | 2,4-dimethoxy-5-chlorobenzene | Do. |
| (38) | 2,4-dietboxy-5-aminophenyl-1-trifluoromethylsulphone | 2-4-dimethoxy-5-chlorobenzene | Do. |
| (39) | 2,5-dichloro-4-aminophenyl-1-trifluoromethylsulphone | 3-nitrobenzene | Brick-red. |

Since an object of the present invention is to provide dyestuffs of good fastness properties which dyestuffs are insoluble in water and alkalies, it is to be understod that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulphonic and the carboxylic acid group.

We claim:

1. The water-insoluble azo-dyestuffs of the following general formula:

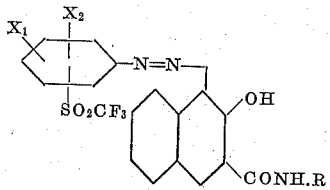

wherein $X_1$ stands for a member of the group consisting of hydrogen, halogen and alkoxy, $X_2$ for a member of the group consisting of hydrogen, halogen, methyl, alkoxy and alkylsulphonyl, and R means a member of the group consisting of radicals of the benzene and naphthalene series, yielding, when produced on the fiber, golden-yellow to ruby-red shades of good fastness properties, particularly of very good fastness to light.

2. The water insoluble azo-dyestuffs of the following general formula:

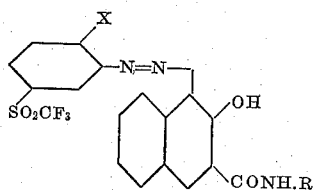

wherein X stands for a member of the group consisting of hydrogen, halogen, methyl, alkoxy and alkylsulphonyl, and R means a member of the group consisting of radicals of the benzene and naphthalene series, yielding, when produced on the fiber, golden-yellow to red shades of good fastness properties, particularly of very good fastness to light.

3. The water-insoluble azo-dyestuffs of the following general formula:

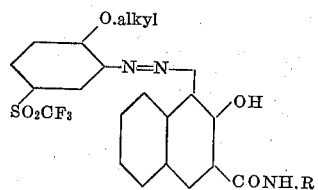

wherein R means a radical of the benzene series, yielding, when produced on the fiber, scarlet to red shades of good fastness properties, particularly of very good fastness to light.

4. The water-insoluble azo-dyestuff of the following formula:

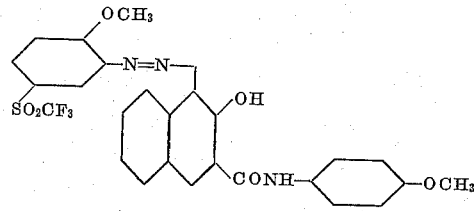

yielding, when produced on the fiber, yellowish-red shades of good fastness properties, particularly of very good fastness to light.

5. The water-insoluble azo-dyestuff of the following formula:

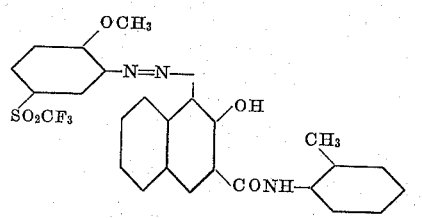

yielding, when produced on the fiber, vivid middle-red shades of good fastness properties, particularly of very good fastness to light.

6. The water-insoluble azo-dyestuff of the following formula:

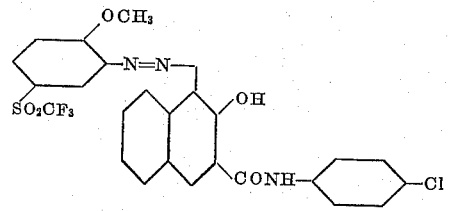

yielding, when produced on the fiber, vivid bluish-red shades of good fastness properties, particularly of very good fastness to light.

7. Fiber dyed with the dyestuffs as claimed in claim 1.

8. Fiber dyed with the dyestuffs as claimed in claim 2.

9. Fiber dyed with the dyestuffs as claimed in claim 3.

10. Fiber dyed with the dyestuff as claimed in claim 4.

11. Fiber dyed with the dyestuff as claimed in claim 5.

12. Fiber dyed with the dyestuff as claimed in claim 6.

FRITZ MÜLLER.
WILLY SCHUMACHER.
OTTO SCHERER.